G. W. HENNING.
VOTING MACHINE.
APPLICATION FILED FEB. 11, 1911.
1,080,444.
Patented Dec. 2, 1913.
10 SHEETS—SHEET 1.
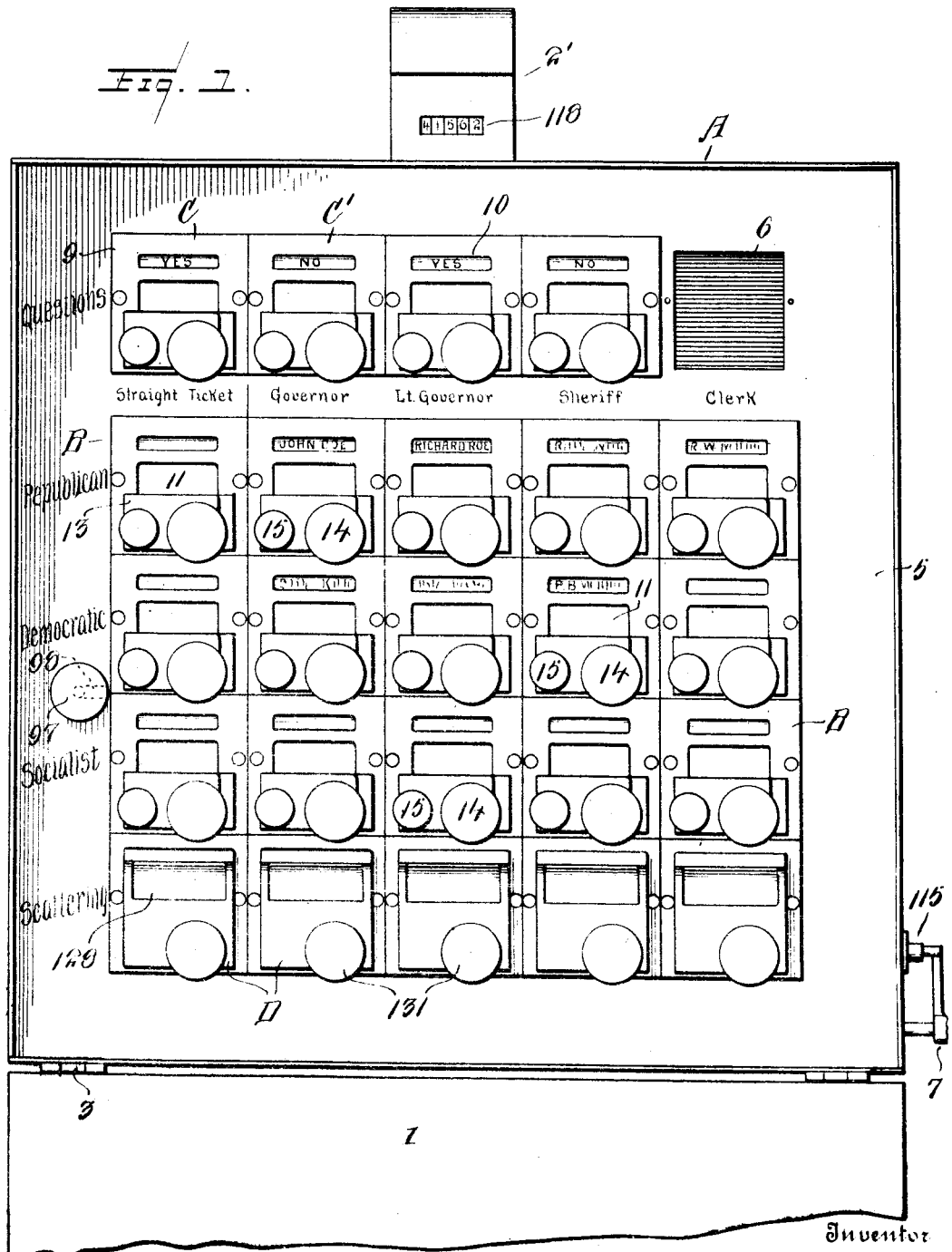
Witnesses
Inventor
George W. Henning
By Victor J. Evans
Attorney

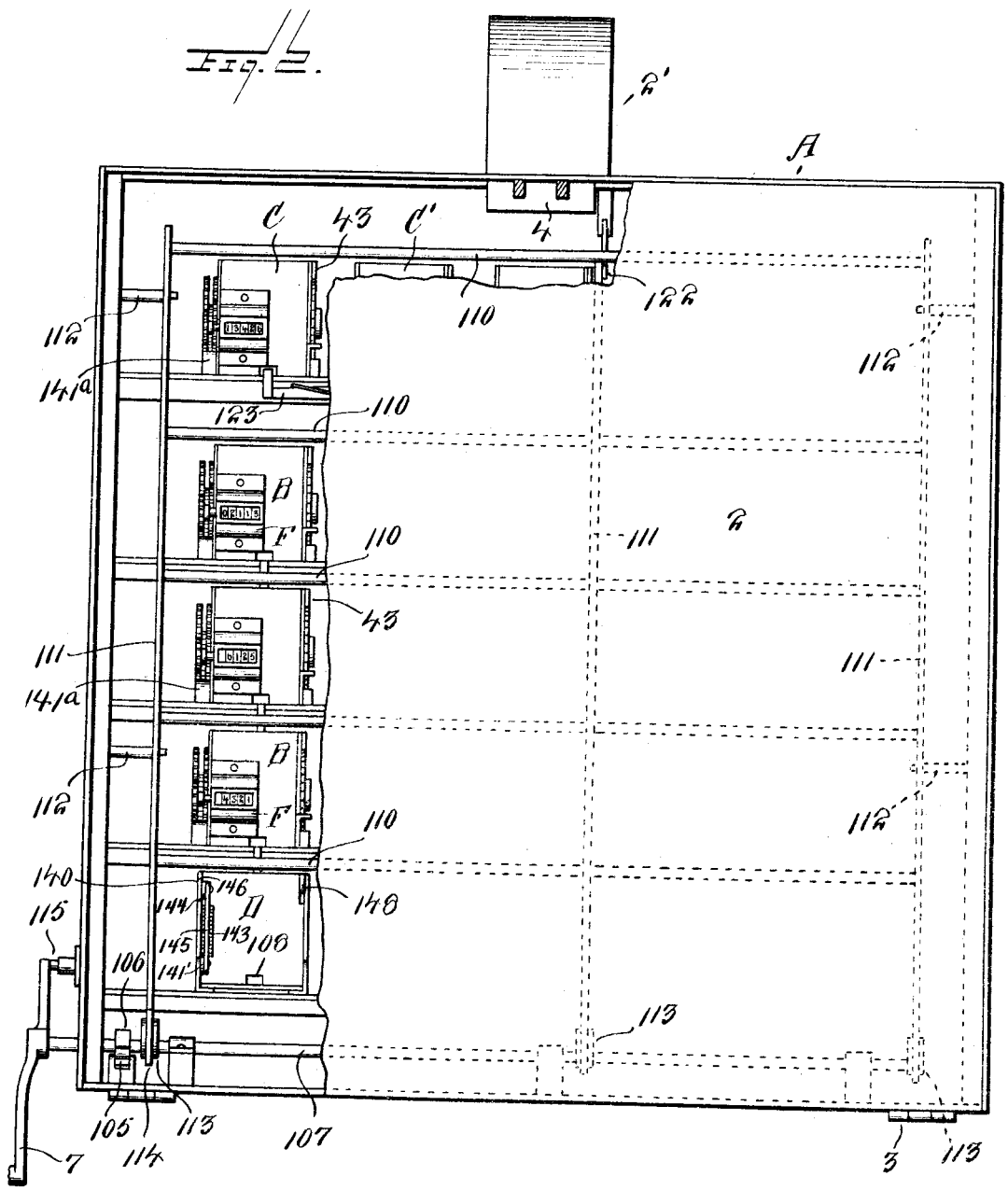

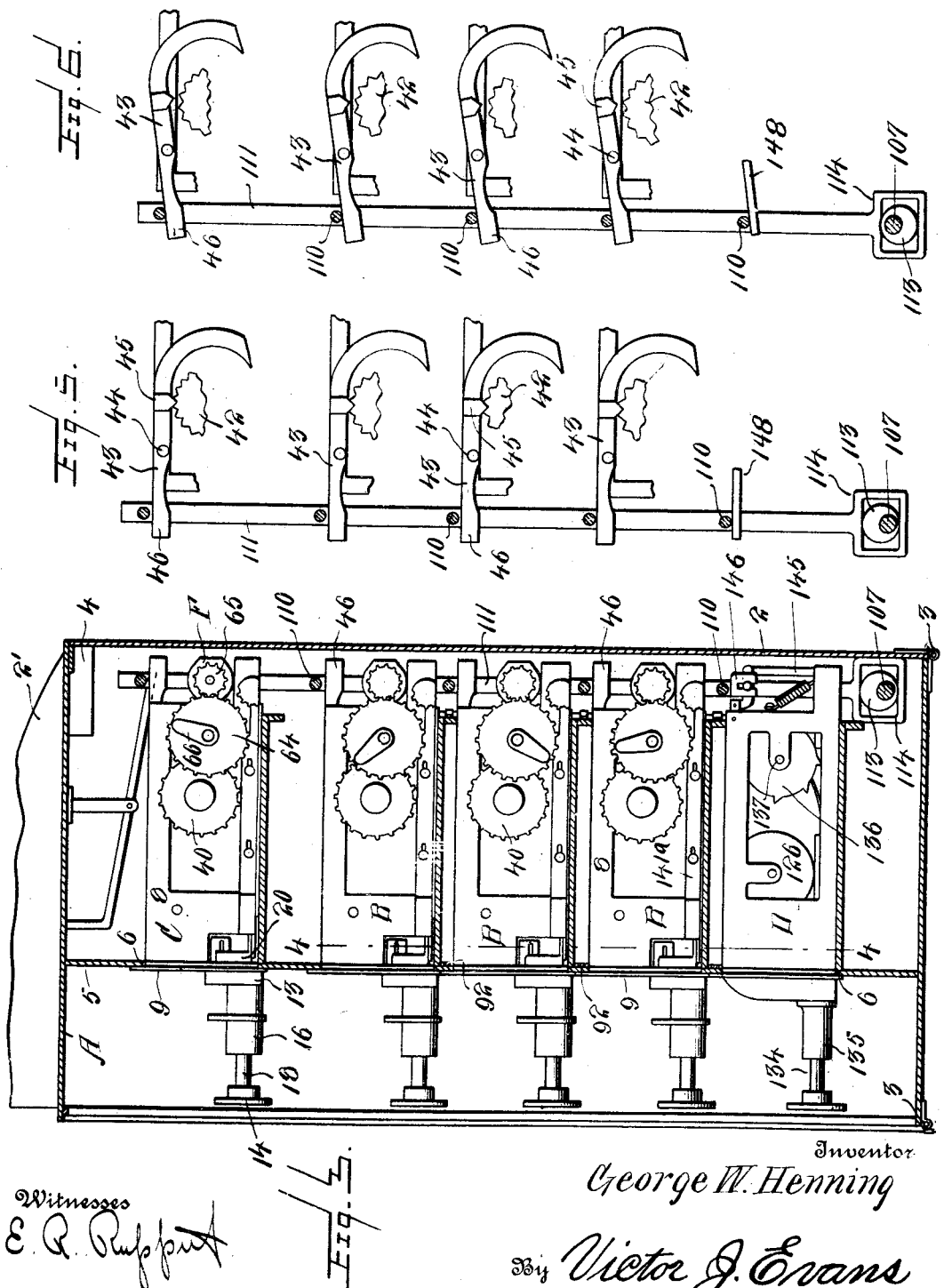

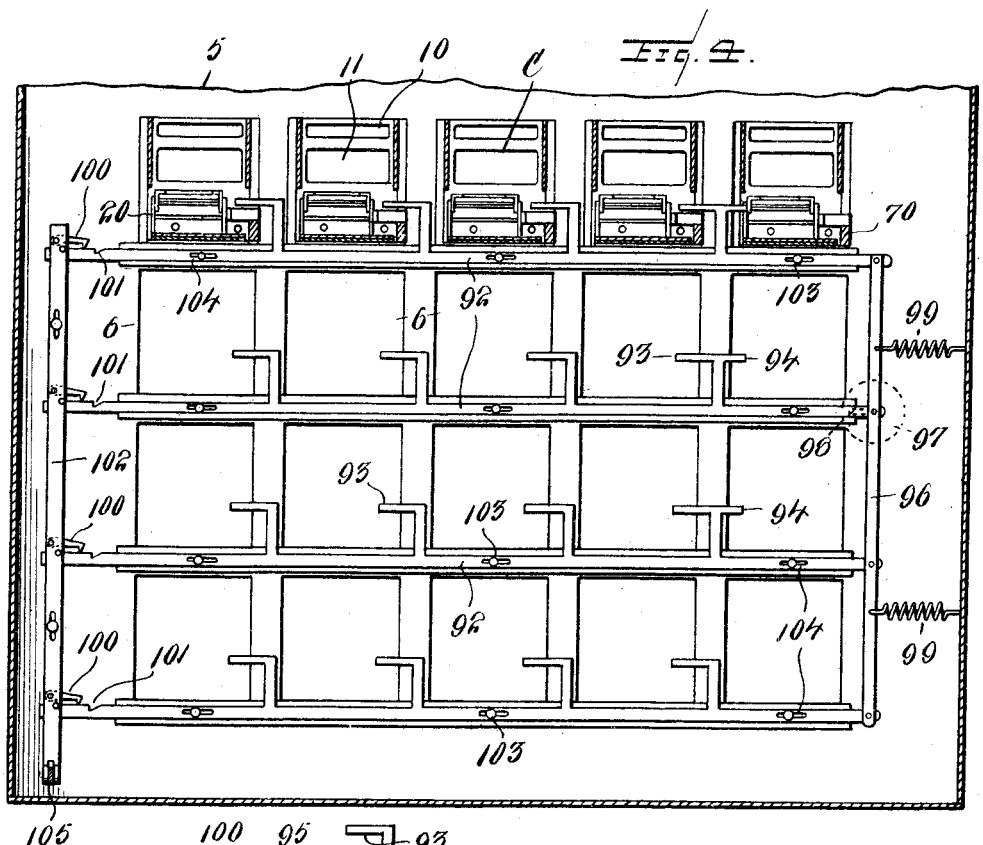

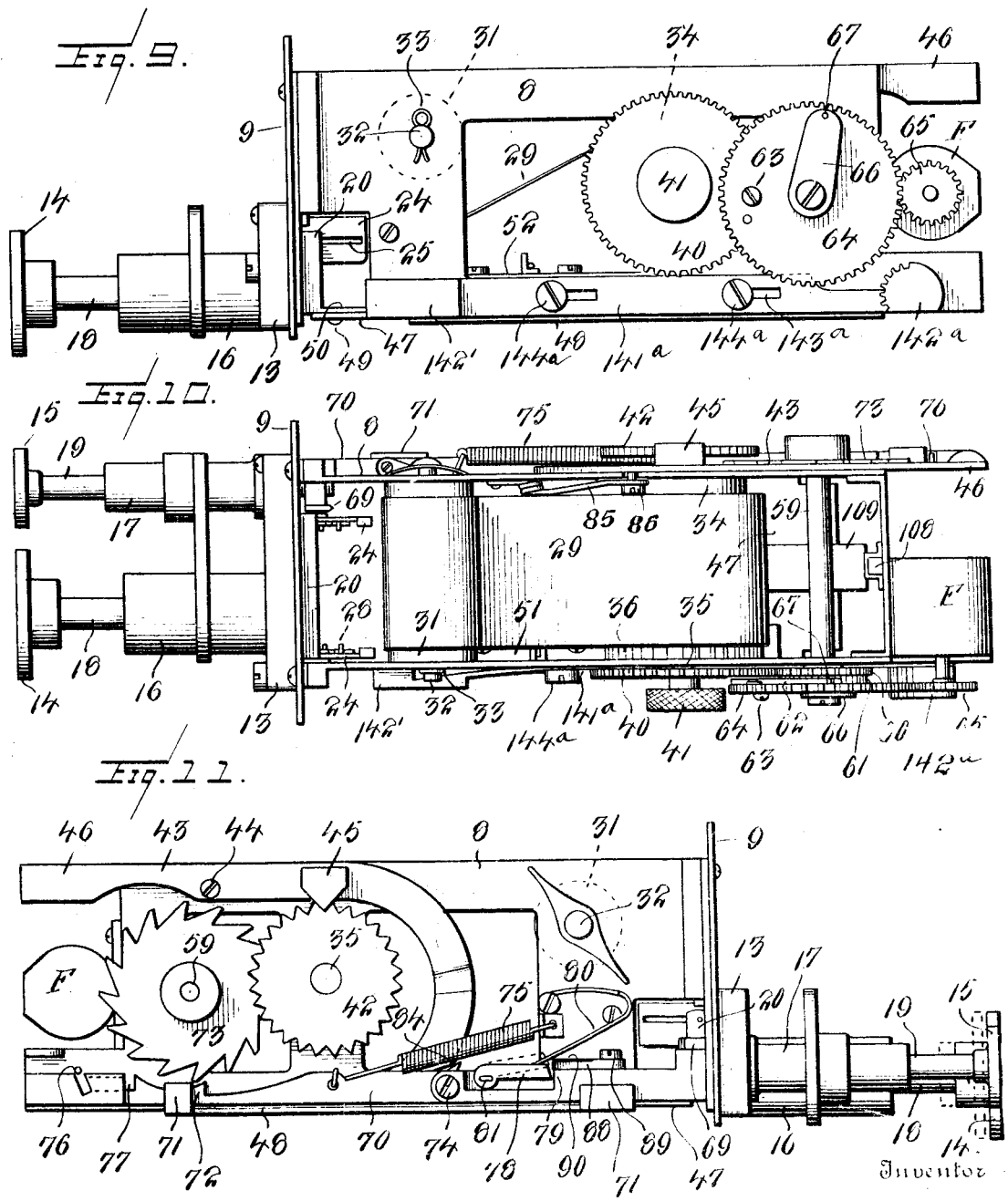

G. W. HENNING.
VOTING MACHINE.
APPLICATION FILED FEB. 11, 1911.
1,080,444.
Patented Dec. 2, 1913.
10 SHEETS—SHEET 6.
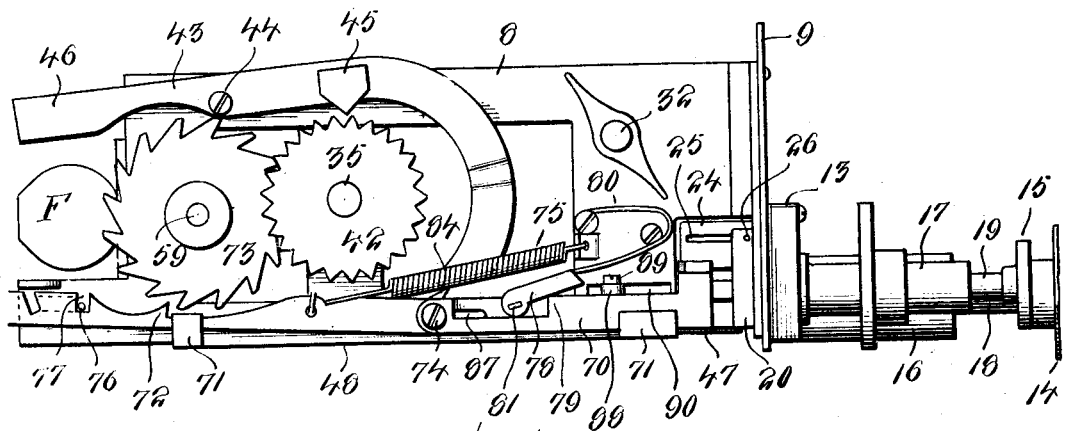
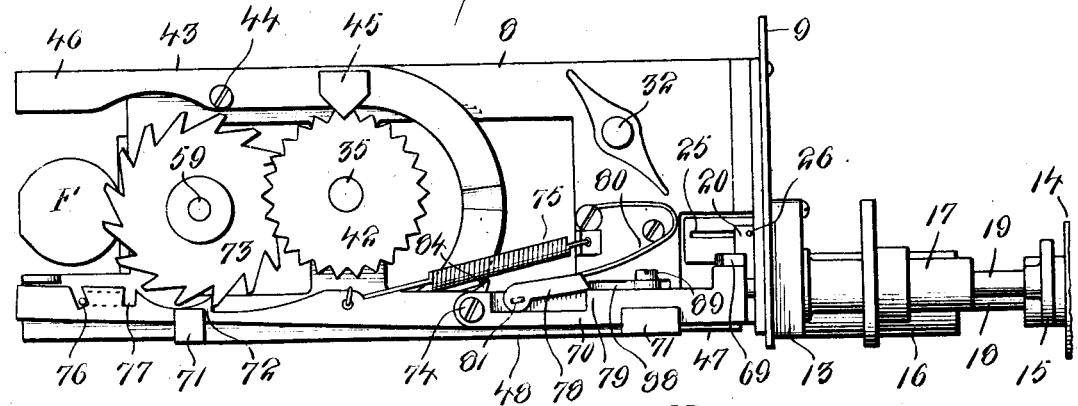
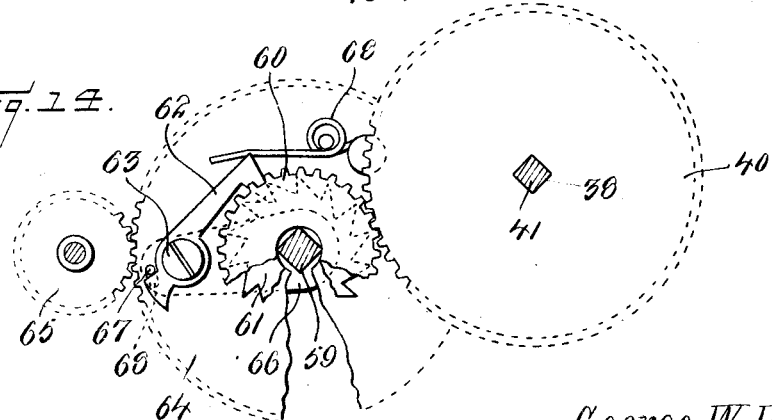
Witnesses
E. R. Ruppert
C. N. Bradway
Inventor
George W. Henning
By Victor J. Evans
Attorney

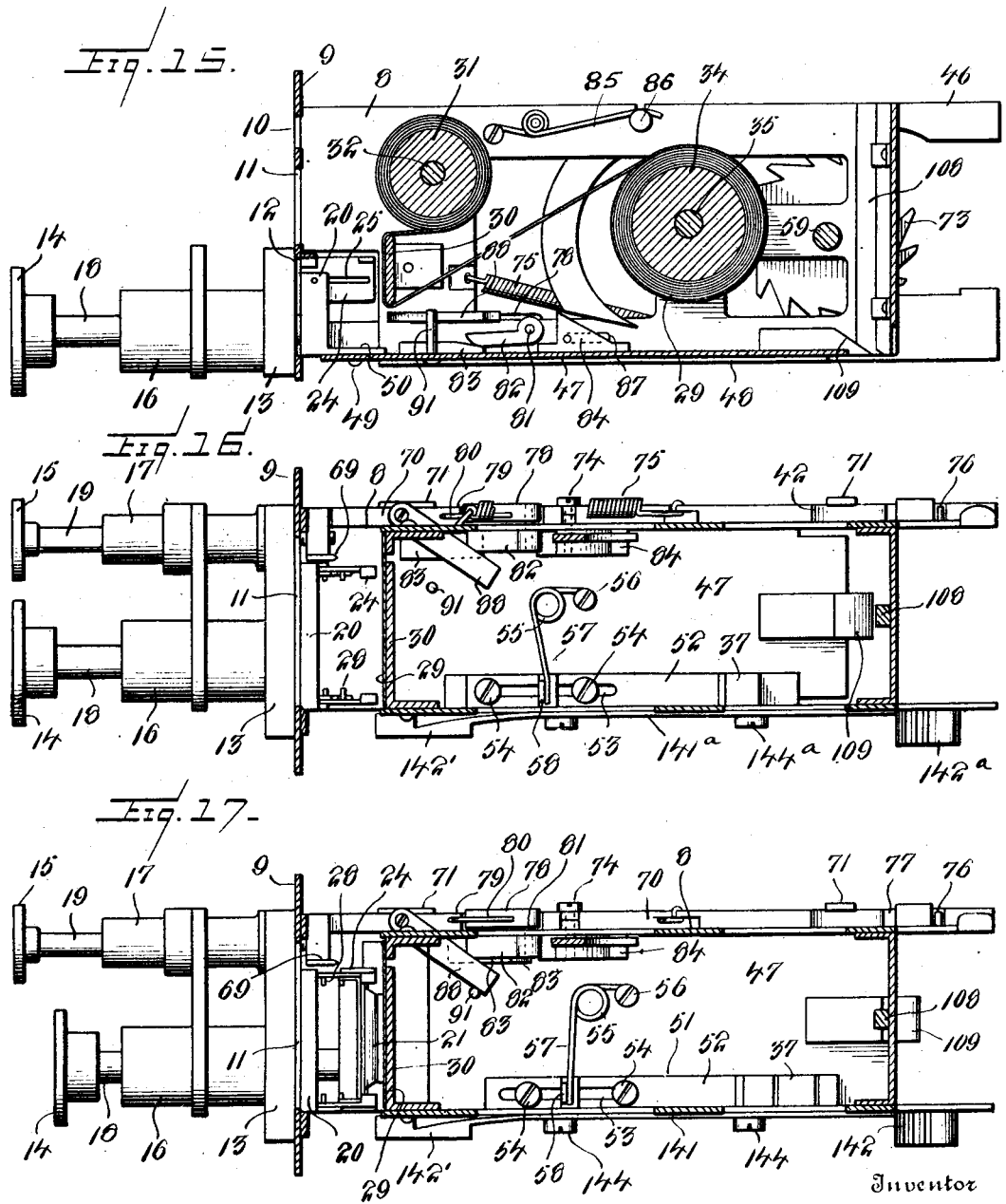

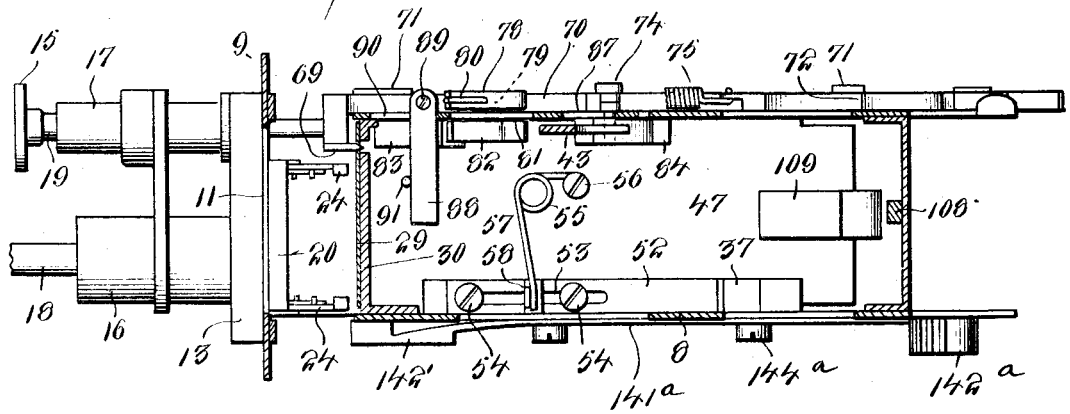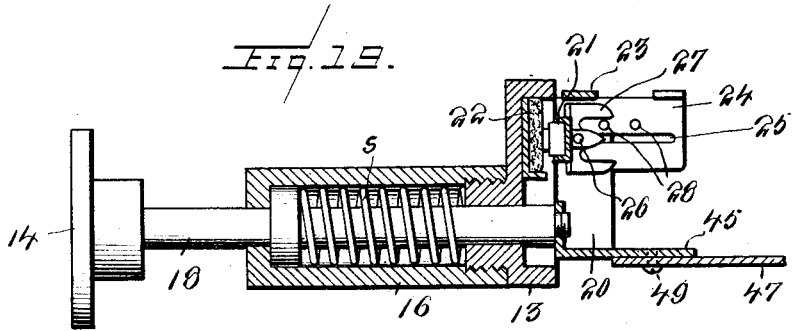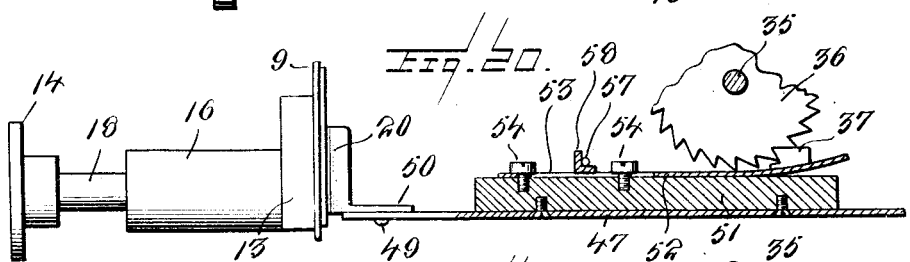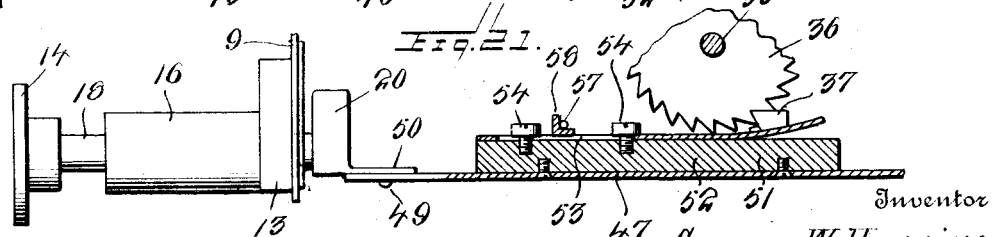

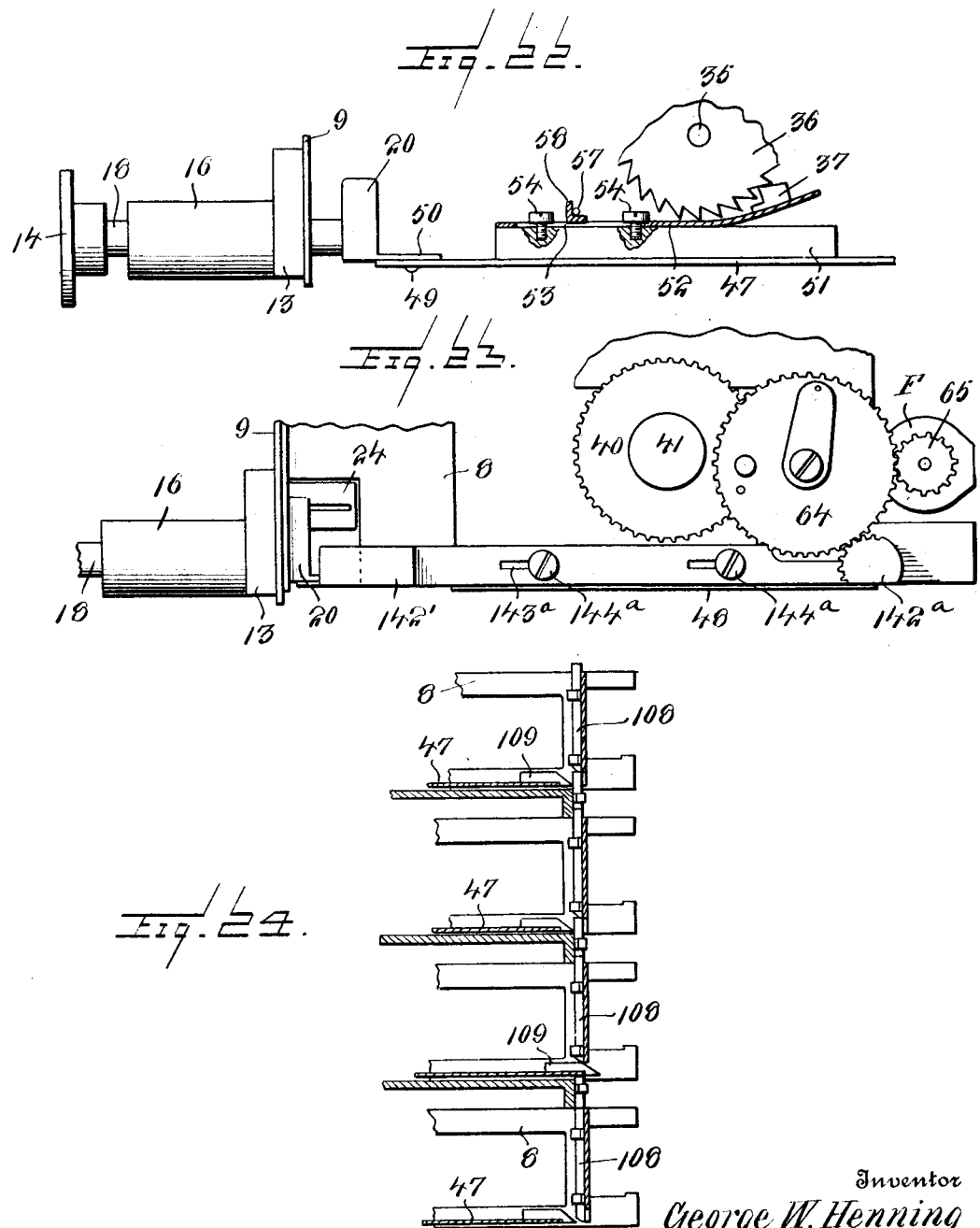

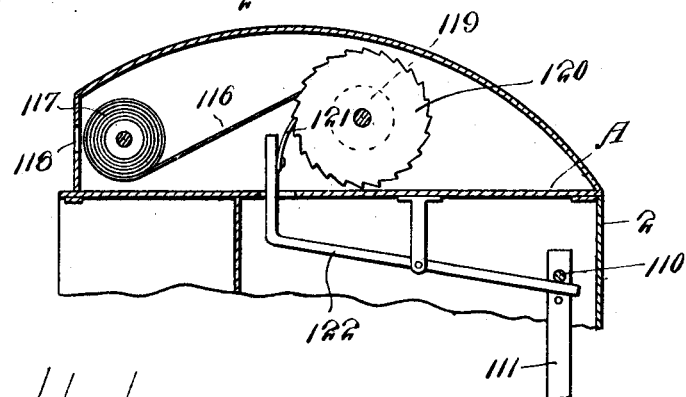
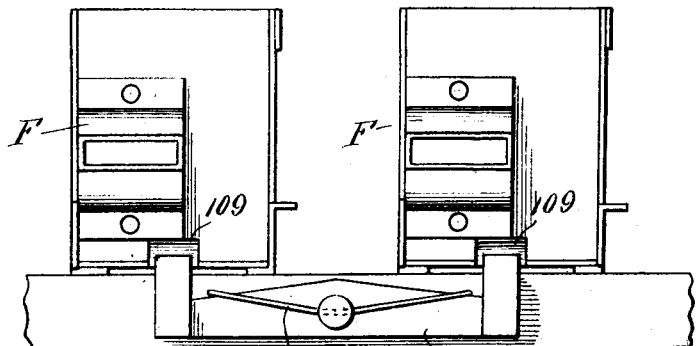
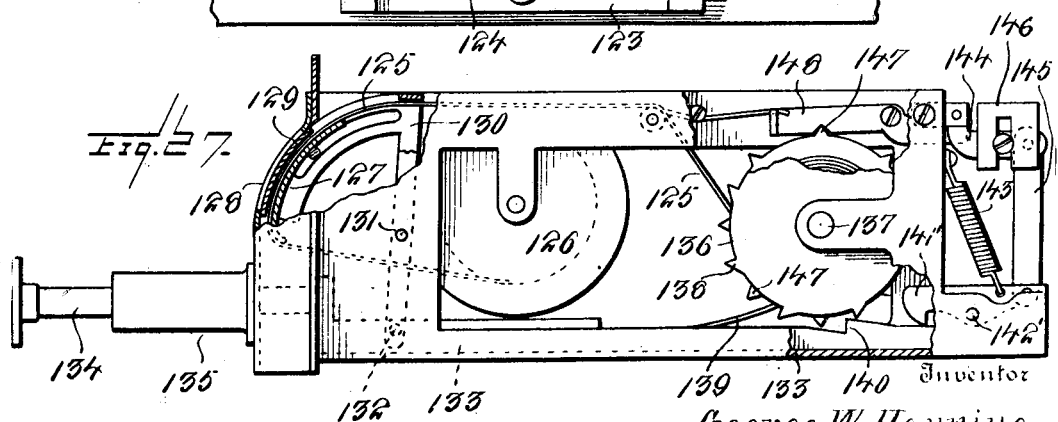

UNITED STATES PATENT OFFICE.

GEORGE W. HENNING, OF SAN JOSE, CALIFORNIA.

VOTING-MACHINE.

1,080,444. Specification of Letters Patent. Patented Dec. 2, 1913.

Application filed February 11, 1911. Serial No. 607,967.

*To all whom it may concern:*

Be it known that I, GEORGE W. HENNING, a citizen of the United States, residing at San Jose, in the county of Santa Clara and State of California, have invented new and useful Improvements in Voting-Machines, of which the following is a specification.

This invention relates to a voting machine of that type including a plurality of voting units removably mounted in a cabinet and arranged in vertical rows according to the elective offices for which candidates are to be voted, and in horizontal rows according to the recognized parties who have nominated candidates for election, each unit comprising a stamp bearing a candidate's name and a tape on which the name is impressed by each voter when casting his ballot, so that the votes will be accurately recorded.

The invention has for one of its objects to improve and simplify the construction and operation of machines of this character, so as to be reliable and efficient in use, readily manipulated by a voter of ordinary intelligence, and so designed that straight or split tickets can be voted, scattering ballots cast and questions voted on.

Another object of the invention is the construction of a novel voting unit that includes means whereby a voter can cancel a vote which he might have cast by mistake, each unit including registering mechanism on which the vote is first counted on and then counted off when such vote is canceled.

Another object of the invention is the employment of novel lock-out means whereby the corresponding candidates of all the other parties are locked out when a voter casts a ballot for one of the candidates in his selected party, so that it is impossible when voting a split ticket for a voter to cast ballots for more than one candidate running for the same office.

Another object is the provision of a novel interlocking mechanism whereby a voter must, as an initial step in voting a straight ticket, operate a device whereby all the other units will be locked out of use to thereby prevent voting a straight ticket and at the same time casting ballots for individual candidates.

A further object is to provide a simple, effective and novel resetting, or restoring mechanism under the control of the proper election officer so that after an elector has cast his vote, the units can be restored to their original condition in preparation for the next elector to cast his vote, the total number of votes being registered at the same time by means of a register operatively connected with the officer's restoring or resetting mechanism.

Another object of the invention is the provision of a pair of units for the affirmative or negative voting on any question submitted to the electorate and the use in conjunction with such units, of a companion unit lock-out so that when a voter operates the affirmative unit, the negative unit will be locked out of use, and vice versa.

Again, the invention has for one of its objects to employ a unit lock which is adapted to be set at the end of the election after the tally has been taken so that it will be impossible to operate the voting push button of any unit or to tamper with the registering mechanism without first removing the unit from the cabinet, and as the cabinet is provided with locked doors this unit lock insures greater security against altering the election returns or in otherwise tampering therewith.

In the accompanying drawings, which illustrate one embodiment of the invention, Figure 1 is a front view of the machine with the cabinet door open and a view of the voting units removed. Fig. 2 is a rear view of the machine with the rear cabinet door partly broken away. Fig. 3 is a vertical section taken to show the voting units in elevation. Fig. 4 is a vertical section on line 4—4, immediately behind the interlocking mechanism and looking toward the same. Figs. 5 and 6 are sectional views of the voting unit re-setting mechanism shown, respectively, in normally raised position and in resetting lowered position. Fig. 7 is a view of the means for holding the unit interlocking mechanism in that position where all the units except the straight ticket units are locked out of use. Fig. 8 is a detail view of the connection between the crank shaft of the resetting mechanism and the locking catches that hold the interlocking mechanism in locked position. Fig. 9 is a side view of one of the units removed. Fig. 10 is a plan view of the unit. Fig. 11 is a view of the unit at the side opposite from Fig. 9 showing the parts in normal position, and the voting push button being shown by dotted lines as having been pushed in to record a vote and the canceling bar locking dog being shown raised or released by dotted lines. Fig. 12 is a similar view showing the parts of the canceling device in the position they occupy immediately prior to the counting off of the vote in the register that was counted on when the voting button was pushed. Fig. 13 is a similar view showing the tooth on the canceling bar engaged with the counting off ratchet wheel and in a position immediately prior to the tooth releasing the ratchet wheel. Fig. 14 is a detail sectional view showing the gearing between the tape winding drum and vote-registering device. Fig. 15 is a vertical longitudinal section of the unit. Figs. 16, 17 and 18 are horizontal sectional views showing the parts, respectively, in normal position, in vote-registering position and vote-canceling position. Fig. 19 is an enlarged sectional view of the voting push button and stamp. Figs. 20, 21 and 22 are detail views partly in section showing the different positions of the ratchet and pawl device between the voting push button and tape-winding drum. Fig. 23 is a partial side view of the unit showing the unit lock in set position after an election has taken place so as to prevent tampering with the machine to change the election. Fig. 24 is a vertical section taken through several superimposed units showing the manner whereby the unit that is operated by the voter locks out the remaining units of the same row. Fig. 25 is a view of the total vote-registering device and showing its operative relation with the election officer's resetting mechanism. Fig. 26 is a view of the companion unit lock-out device for each pair of affirmative and negative question voting units. Fig. 27 is a side view partly in section of the scattering ballot voting unit.

Similar reference characters are employed to designate corresponding parts throughout the views.

Referring to the drawings, A designates the casing of a voting cabinet or machine which may be made of sheet iron or other suitable material and provided with front and rear doors 1 and 2 that are attached to the bottom of the cabinet by hinges 3 so as to swing downwardly to a pendent open position and each door is provided with a lock 4, the key for which is kept in the custody of the election board so that when the machine is closed and locked, no one can tamper with the election returns after an election is completed and during the interim between elections, the machine thus forming a reliable record at all times. Set into the front of the casing is a front plate or wall 5 that has numerous pigeon holes 6 for receiving the regular party or candidate voting units B, pairs of affirmative or negative question voting units C and C', and scattering ballot voting units D. In the present instance, the units B are arranged in horizontal rows, each row being used for a regular political party and the units of all the parties are disposed in vertical rows that are designated with the title of the elective office for which the candidates are running. The question units are disposed at the top of the cabinet while the scattering voting units are disposed at the bottom thereof. When the machine is in use during the election, only the front door is open and the push buttons of the various units are accessible to the voters. Disposed from one side of the cabinet is an operating crank 7 which the election officer assigned to the machine turns after each voter casts his ballot so as to reset or restore those voting units which the voter has manipulated. In this manner, there is no chance for fraud to be conducted or the machine tampered with. After the election is over, the proper officials open the back door and make a tally of the votes cast for the different candidates, each unit being provided with a register that is located at the rear immediately in front of the door 2. At the top of the cabinet is a total vote registering device 2' which is operatively related with the mechanism which the election officer operates when he turns the crank, so that this registering will tell at a glance how many voters have cast their ballots.

The voting units B and C are constructed after the same principle so that the following description will apply to both.

Each unit consists of a frame 8 that is a box-like skeleton structure having a front plate 9 which is provided with a slot 10 through which is exposed a card bearing the name of the candidate whose votes are to be recorded in the particular unit, and under the slot 10 is a view opening 11 whereby the voter can see that his vote has been recorded on the ribbon or tape. Below the opening 11 is still another opening 12 in front of which is disposed a base 13 that supports the voting and canceling push buttons 14 and 15, respectively, the former button being more conspicuous than the latter and properly designated if desired, so that the voter will be less likely to press the wrong button when voting. On this base 13 are tubes or housings 16 and 17 through which the rods 18 and 19 of the respective push buttons extend, and in each housing is a spring s, Fig. 19, so related to the push button rods as to normally hold the push buttons outward or in forward position. On the rear end of the push button rod 18 is a stamp holder 20 located within the unit frame, and on this holder is mounted a swinging or oscillatory stamp 21 that has the name of the candidate thereon, the type of the stamp being normally held against an inking pad 22 set into the base. The pad is arranged in the holder 23 that has rearwardly extending lugs 24 that are provided with longitudinal slots 25 for receiving the ends of a rod 26 that forms the laterally movable axis on which the stamp swings or oscillates. The stamp has spaced fingers or lugs 27 that coöperate with pins 28 on the members 24 so that as the stamp is moved backwardly by the pressing of the voting push button, the stamp will make a complete half turn so that the inked face or type thereof will be presented to a recording ribbon 29. The stamping mechanism is very much like an ordinary hand-operated self-inking dating stamp common in office use. The type 29 moves over the front side of a fixed platen 30 that extends from one side wall of the unit frame to the other and has a vertical front face on which the tape bears when it receives an impression from the stamp. The tape passes off a feed roll or spool 31 that is removably mounted on a shaft 32 journaled in bearings in the side walls of the unit frame, said shaft having a cotter pin 33 which can be taken out when the shaft and spool are to be removed when a new recording tape or ribbon is to be applied. The ribbon unwraps from the rear side of the spool and passes downwardly over the front of the platen and rearwardly under the bottom edge thereof and continues therefrom to a winding spool or drum 34. The winding drum for the recording tape is adapted to turn step by step as each vote is cast. On the shaft 35 of the drum is a ratchet wheel 36 with which coöperates a pawl 37 that is moved into operative engagement with the ratchet wheel by the voting button 14 being pushed inwardly so that the spring s, Fig. 19, of the push button, upon expanding, will cause the winding drum to turn one step to bring a new portion of the ribbon opposite the stamp. The shaft 35 is fitted in a hole in the wheel 36, and this shaft is mounted in bearings in the side walls of the unit frame and is removable longitudinally therefrom so that the recording tape, when filled, can be taken off the winding drum. The ratchet wheel is located within the unit frame and the shaft 35 has a squared portion 38 for receiving a large gear wheel 40 that forms on a element of a gearing that operates the rear storing device F fastened to the rear end of the unit frame. This gear wheel 40 is disposed outside the unit frame and is held in place by a knurled nut 41 which is taken off when the winding drum is to be removed. It is intended that the winding drum shall turn not by the inward movement of the voting push button but when the election officer turns the crank 7. For this purpose, the locking means is provided in the form of a star wheel 42 that is fastened to the end of the shaft 35 opposite from the gear 40, and coöperating with this star wheel, which is located outside the unit frame, is a detent 43 that is pivoted at 44 on the unit frame and has a tooth 45 which engages the star wheel. The detent has its rear end 46 projecting beyond the unit and is adapted to be operated by the resetting mechanism under the control of the election officer so as to raise the tooth of the detent out of engagement with the star wheel. The star wheel being thus released, the spring s, Fig. 19, of the push button expands and causes the pawl 37 to turn the ratchet wheel 36, and consequently the winding drum one step. The pawl is operatively connected with a slide 47 that moves on flanges 48 at the bottom of the unit frame, and this slide is detachably connected by screws 49 to a rearwardly-extending flange 50 on the stamp holder so that when the stamp is pressed inwardly, the slide moves with it. On the slide at one edge thereof is fastened a bar 51 that forms a support for the pawl 37. This pawl has a thin bar-like shank 52 that slidably rests on the top surface of the bar or support 51. This shank has longitudinal slots 53 through which extend stops 54 in the form of screws threaded in the part 51, which may be considered as a portion of the slide, as it is fixed to and moved therewith. The slide is provided with a coiled spring 55 which has one end anchored at 56 to the slide, and the other end formed into a finger 57 which engages behind a stop 58 on the pawl. The stops 54 are so arranged with respect to the pawl that the slide has a limited movement before the pawl moves with it at the time the push button is pressed rearwardly, and during the last part of the movement of the slide, the pawl moves with it so that the tooth of the pawl will engage the succeeding tooth of the ratchet wheel 36, the pawl being in the form of a spring so as to slide rearwardly under the ratchet wheel from tooth to tooth. During the final part of the movement of the slide, the stamp will make an impression on the tape and as soon as the voter relieves the pressure on the push button, the same will move forwardly a short distance, together with the slide 47, while the pawl remains for the time being immovable because of its engagement with the ratchet wheel 36. Since the ratchet wheel is fixed on the shaft 35 and the detent is normally engaged with the star wheel on such shaft, it is obvious that the pawl cannot move forwardly with the push button and slide. Although the spring 55 moves with the slide, it still exerts a tension on the pawl in a direction to maintain the same engaged with the ratchet wheel 36. The push button is prevented from moving its full range forwardly when the voter releases the same because the front stop 54 of the slide engages the front end of the front slot 53 in the pawl and the pawl thus limits the first movement of the push button forwardly and hence retains the push button spring still under compression. As soon as the election officer operates the crank 7, the detent will be disengaged from the star wheel so that the push button spring will cause the slide 47 and pawl 37 to move together and turn the winding drum.

The gearing between the winding drum and register F is of special design for the reason that the vote which is counted on the register by the manipulation of the voting button 14 must be counted off when the canceling button 15 is manipulated. Behind the winding spool or drum is a shaft 59 journaled in the side walls of the unit frame, and on this shaft is a pinion 60 with which the gear 40 is in turn in mesh. Also on the shaft 59 is a ratchet wheel 61 with which engages a pawl 62 pivoted at 63 on a large gear wheel 64 which, like the pinion 60 and ratchet wheel 61, is loose on the shaft 59. The gear wheel 64 meshes with the pinion 65 on the shaft of the register F. Fastened to the shaft 59 to rotate therewith is an arm 66 that has a pin 67 passing through a slot 68 in the gear wheel 64, the said pin being arranged to engage the pawl 62 and cause the latter to release the ratchet wheel 60 when a vote is to be counted off the register. The pawl 62 is normally held engaged with the ratchet wheel 61 by means of a spring 68 suitably arranged on the gear wheel 64. When the winding drum turns, the shaft 59, the pinion 60, ratchet wheel 61, pawl 62, and gear 64 move as a unit so that motion will be transmitted to the vote-registering device F, which latter is of the usual integrating type. During this transmission of movement from the gear wheel 40 to the pinion of the registering device, the gear wheel 64 moves in clockwise direction, Fig. 14. Upon the canceling of a vote, the shaft 59 is turned anti-clockwise upon the releasing of the canceling button, as will hereinafter appear, and as the result the pawl 62 is first released from the ratchet wheel 61, as shown in Fig. 14, by the pin on the arm 66, and then the shaft 59, arm 66 and wheel 64, turn as a unit for reversing the pinion of the registering device to count off the vote previously registered. In other words, during the counting off of a vote by the canceling mechanism, the pinion 60 and ratchet wheel 61 on the shaft 59 remain stationary because the said pinion is in mesh with the gear wheel 40 of the winding drum, said drum being prevented from turning by the detent 43.

The canceling device consists of a punch 69 arranged on the inner end of the push button rod 19 so as to perforate the recording tape opposite the name which the voter, by mistake, has impressed thereon by previously pushing the button 14. This punch is connected with a canceling bar 70 which slides in guides 71 on the side of the unit frame, and this slide moves rearwardly to the punch so that a tooth 72 on the rear portion thereof will be brought into coöperative relation with a ratchet wheel 73 on the shaft 59. The canceling bar is composed of front and rear sections hingedly connected at 74, and normally the rear section is so disposed that the tooth 72 thereof is below and clear of the ratchet wheel 73. This tooth is maintained clear of the wheel during the backward movement of the canceling bar, and when the bar reaches the end of its movement, the rear end is snapped upwardly so as to engage the tooth thereof with the ratchet wheel and thus effect the turning of the wheel as the canceling push button spring expands when the voter releases the canceling push button. A light helical expansion spring 75 is connected to the rear portion of the canceling bar and also connected with the unit frame, the ends of the spring being located at opposite sides of the hinge in the canceling bar, and the spring has its axis at an oblique angle to the line of movement of the latter. As the canceling bar is pushed backwardly, the rear end would tend to swing upwardly and engage the tooth with the ratchet wheel and thus interfere with the rearward movement of the canceling bar. For this purpose, a lateral projection or stop 76 is arranged on the side of the unit frame so as to engage the top of the canceling bar and thus prevent the latter from raising until the tooth on the bar has traveled the full length of one tooth on the ratchet wheel. At this time, the front end of a cam slot 77 comes opposite the stop 76, as in Fig. 12, so that the tooth-carrying rear end of the canceling bar can snap upwardly to engage the ratchet wheel. The slot 77, which is in the inner side surface of the bar 70, is open at its front and rear ends in the top surface of the bar and normally the pin or stop 76 is adjacent the rear end of the slot, as shown in Fig. 11. The canceling push button, upon being released, will cause the canceling bar to slide forwardly with the rear end held elevated by the fixed pin or stop 76 being disposed in the cam groove 77, and consequently the tooth 72 on the canceling bar will be maintained in engagement with the ratchet wheel 73 until the latter has moved far enough to count off the vote previously added by the registering device F. At this instant, the rear end of the slot 77 will have reached the pin or stop 76 so that the rear section of the canceling bar will drop down from the position shown in Fig. 13 to the normal position shown in Fig. 11, the spring 75 being normally without tension so as not to interfere with this dropping or releasing of the canceling bar from the ratchet wheel 73.

The canceling operation cannot be carried on without the voting button having first been pushed inwardly. In doing this, a canceling bar locking dog 78 is raised out of engagement with a shoulder 79 on the front section of the canceling bar so that the canceling bar can move rearwardly under the elevated dog. This dog, which is normally held in locking position by a spring 80 fastened on the inner frame, is secured to a pivot 81 which passes through the side wall of the unit frame and has fixed thereto a forwardly-extending finger or member 82 that rests on a cam or sloping surface 83 on the slide 47 so that as the slide moves rearwardly, the member 82 is raised so as to release the locking dog 78 from the canceling bar.

Before the canceling of the vote and counting off takes place, the vote is counted on the register and this is effected by means of a sloping surface 84 or cam, which is arranged within the unit frame but connected with the canceling bar, and its purpose is to ride under the lower end of the detent 34 in order to raise the latter far enough to permit the winding drum to turn by the voting button spring expanding, just the same as when the election officer operates the detent. This winding of the tape takes place immediately prior to the canceling punch perforating the tape and prior to the tooth 72 on the canceling bar engaging the ratchet wheel 73 so that the tape will have ceased moving at the time the punching takes place, but the punch is so located that it perforated the tape opposite the name that was previously stamped thereon when the voter erroneously pushed the voting button. Since the winding of the tape is accompanied by the turning of the register device F, it is obvious that as soon as the canceling button has been pressed in its full distance and released, that vote will be counted off so that the number shown on the wheels of the register F will be the same as before. The detent is pressed downwardly so that its tooth 45 will normally engage the star wheel 42 and its lower end normally engage the cam 84 of the canceling bar by a spring 85, Figs. 10 and 15, disposed within the unit frame and having one end bearing on a projection 86 on the detent. The cam 84 is attached to the canceling bar by a screw which forms the pintle between the two sections of the canceling bar, and this screw passes through a slot 87 in the side of the unit frame. In order to prevent improper operation of the unit when either push button is being manipulated, an automatic lock-out for the idle push button is provided. This consists of a swinging member 88 pivoted at one end by a screw 89 on the front section of the canceling bar and this member extends into the unit frame through a slot 90 in the side thereof and has its free end located within the path of a stop 91 on the slide 47. When the voting push button is pressed inwardly, the stop 91 engages the free end of the locking member 88 so that the latter prevents the canceling bar from being moved inwardly to its full extent because the member 88 will strike the rear end of the slot 90. This end of the slot, together with the stop 91, prevents the member 88 from tilting as it has to do when the canceling push button is properly operated. It will thus be seen that the voting push button must first be released before the canceling button can be manipulated to cancel the vote when an error has been made or the voter changes his mind. When the canceling bar is pressed inwardly, the member 88 prevents the voting button from being pressed inwardly to its full extent because the stop 91 on the slide 47 strikes the member 88 which is in a position to prevent the stamp from engaging the tape. This push button lock-out member 88 thus operates effectively on both push buttons and prevents the improper recording or canceling of votes on the tape.

The three units of the party tickets nearest to the left are used for straight voting and in order to prevent any voter from casting a straight ticket and then voting for individual candidates of any of the parties, an interlocking mechanism for the units is employed. At the rear side of the front wall of the machine are horizontal bars 92 located between the horizontal row of units, and each bar is equipped with fingers 93 so disposed as to slide into openings in the sides of the units reserved for the individual candidates and thus engaged behind the stamps of such units to prevent the voting buttons thereof from being pressed. These bars 92 are also provided with fingers 94 which extend into the units for the straight ticket voting to prevent the voting push buttons thereof from being operated. These bars 92 are movable in guides 95 on the frame of the machine and they are connected together by a vertical bar 96 so that all the sliding bars 92 will move together to either lock all the straight ticket units or all the candidate unit tickets, depending upon the manner in which the voter intends to cast his ballot. The interlocking frame thus constructed is provided with a knob 97 that extends out of the front of the cabinet through a slot 98 and the interlocking frame is held by springs 99 in such a position that the individual candidate units are normally unlocked and the straight ticket units locked. The voter desiring to cast a straight ticket must then push the knob 97 to the right before pressing the voting button on the straight ticket unit for his selected party. The interlocking frame is adapted to be held in this shifted position by catches 100 so arranged as to engage notches 101 in the ends of the sliding bars 92, and these latches are connected with a vertically-movable rod 102 that is adapted to be operated at the same time the election officer resets the units. The sliding bars 92 are held in their guides by headed screws 103 passing through longitudinal slots 104 in the bars and screwing into the frame of the cabinet. The means for releasing the catches consists of a lever 105 fulcrumed in the cabinet in such a position that it will engage the lower end of the catch releasing rod 102, and this lever is tilted by a snail cam 106 on the shaft 107 to which the crank 7 is attached, the snail cam and lever also acting to prevent reverse rotation of the crank shaft, which latter is mounted horizontally to the cabinet at the bottom and rear thereof. Of course, when the voter wishes to cast a split or mixed ticket, he pays no attention whatever to the knob 97 but operates the push buttons for his list of candidates.

When voting for individual candidates, it is necessary to prevent a voter from casting two votes for candidates running for the same office, and for this purpose, automatic locking means thrown in operation by the pressing of a push button is provided. This means consists of a vertically-sliding bolt 108 arranged within each unit frame on the rear wall thereof and is adapted to be raised by means of a sloping surface or cam 109 on the top surface of the slide 47 when the slide is moved backwardly by the pressing of the voting button. This throws the upper end of the bolt across the path of the slide 47 of the next superimposed unit and consequently prevents such slide from operating and a like movement occurs with all the other units above that unit being used. As the slide of the unit being voted is disposed in the line of the bolts, it is obvious that the bolts of the units below that particular one can not slide upwardly, and consequently such lower units will be also locked.

After the elector has finished voting, the election officer turns the crank to re-set or restore the units. The turning of the crank causes the detents 43 of all the units to be actuated. Over the detents of each row of units is a horizontal bar or rod 110 that terminates adjacent the sides of the cabinet and the ends of these rods are all rigidly secured to vertical side members 111 so as to form a skeleton rectangular frame. These side members 111 have vertical slots into which project supporting brackets 112 on the sides of the cabinet so that the detent-operating frame can move bodily in a vertical plane. On the crank shaft 107 are eccentrics 113 which engage in slotted members 114 on the lower ends of the resetting frame, so that as the shaft is turned, the frame will be lowered and raised. The frame is normally in raised position and the officer makes one complete turn of the crank in order to cause the resetting of the units. Projecting from the side of the cabinet is a yielding stop 115 against which the crank strikes when one complete revolution is made, but when the crank is positively turned, the stop will yield out of the path of the crank so as to offer no obstruction to the movement thereof. This resetting of the units occurs simultaneously with the resetting or returning of the interlocking mechanism to its normal position.

The total vote registering device at the top of the machine includes a number-bearing ribbon 116 that unwinds from a spool 117 disposed behind a view opening 118 in the housing of this registering mechanism, so that one number at a time will be visible. This ribbon winds on a drum or spool 119 arranged in the casing of the registering device and on this spool is a ratchet wheel 120 with which engages a pawl 121. (Fig. 25.) This pawl is connected with a lever 122 fulcrumed on the top of the cabinet and operatively connected with the top of the unit resetting frame so that every time the election officer turns the crank, the number tape or ribbon 116 will move one step to show at any time the number of voters who have cast their votes.

Referring now to the affirmative and negative question voting units C and C', it will be noted that at the rear of the cabinet is arranged a tilting lock-out device 123 which is centrally fulcrumed between the said units, and the ends of this device are so arranged that the slide 47 of that unit which is operated will engage the adjacent extremity of the device 123 so that its sloping cam surface 109, shown particularly in Figs. 24 and 26, will cause the device 123 to be tilted so as to throw one end upwardly behind the slide of the inoperative unit so as to prevent the same from being manipulated. Normally, the device 123 is held by a spring 124 in a position to prevent both question units from being operated simultaneously, but it is free to be tilted by one unit or the other to form a positive lock-out means for the unit attempted to be operated subsequently to that one which threw the lock-out device into operation.

Each unit D for scattered voting includes a tape 125 on which the voter is adapted to write the name of his chosen candidate who has not been nominated by one of the regular parties. The tape unwinds from a spool 126 mounted in the unit frame and passes over a platen 127, said platen being disposed behind an opening 128 in the unit frame through which the voter writes on the tape, the said opening being normally closed by a swinging shutter 129 that is carried by a frame 130 arranged within the unit and pivoted at 131, the lower portion of the frame being connected at 132 with the slide 133 which is connected with the push button 134. Thus, when the push button is pressed inwardly, the shutter 129 will swing downwardly and expose the portion of the tape through the opening 128 so that the voter can write on the tape. The push button is normally held outwardly by a return spring (not shown) in the guide 135 and consequently when the push button returns to normal position, the shutter 129 will swing upwardly to close the opening 128. The tape 125 winds on a drum 136 journaled at 137 at the rear portion of the unit frame and this drum has ratchet teeth 138 at one end with which engages a leaf spring pawl 139 fastened on the slide 133 in the bottom of the unit frame, and as the result, when the push button is pressed inwardly, the winding drum will turn one step. On the slide 133 is a tooth or shoulder 140 adjacent the drum 136, and with this tooth is adapted to engage a latch 141' pivoted at 142' at the rear end of the unit frame, said latch serving to prevent the push button to return to normal position when the voter releases the same. This latch is adapted to be released when the election officer turns the crank that controls the resetting frame shown in Fig. 2. Attached to the latch 141' is a spring 143 which pulls the latch upwardly and holds the same in locking position. An arm 144 is pivoted on and extends rearwardly from the top of the unit frame and is connected by a link 145 with the rear end of the latch 141' and on this arm 144 is an adjustable abutment 146, the said abutment being engageable by the lower rod 110, Fig. 2, of the re-setting frame. When the rod 110 moves downwardly, it strikes the abutment 146, depressing the arm 144, link 145, and rear end of the latch 141'. The slide 133 can then move forwardly under the tension of the push button spring. In order to prevent overtravel of the winding drum, one end of the same has spur teeth 147 which engage a spring-pressed pawl or brake lever 148. This lever will yield when the push button key causes the slide 133 to move forwardly.

After the election is over, the rear door is opened so that the total number of votes for the straight tickets for the individual candidates and for questions submitted for vote are ascertained from the registering devices on the ends of the units. The rear ends of the units have duplicate cards so that the results can be properly recorded under the names of the individual candidates, etc. To prevent the units from being tampered with, the election officers lock the individual units by means of a sliding bar 141ª, Figs. 18 and 23, on the side of each unit, the same having at its rear end a toothed member 142ª that meshes when the unit is locked with the gear wheel 64, as shown in Fig. 23. The front end of the slide is formed into a spring and is provided with an enlargement or head 142' which, as shown in Figs. 16 and 17, bears normally against the side of the unit frame. While in this position the spring portion of the sliding bar is flexed or under tension so that when the bar is moved to the position shown in Fig. 23, the head 142' snaps in behind the stamp of the unit so that the push button cannot be operated. It will thus be seen that should the cabinet be open at the front or rear, the registering devices could not be tampered with nor could the push buttons be operated. To release this unit locking means, it is necessary to take the unit out of the cabinet and first spring the head of the slide laterally and then slip the slide rearwardly to its inoperative position. The slide has slots 143ª through which extend screws 144ª that are threaded in the adjacent side of the unit frame.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim as new, is:—

1. In a voting machine, the combination of means for holding an impression receiving element, a voting element movable into engagement with the element, a canceling element, and means controlled by and dependent upon the operation of the canceling element for moving the impression receiving element after the voting element moves out of engagement therewith and before the canceling element engages the impression receiving element.

2. In a voting machine, the combination of a tape holding means, a voting element for impressing the tape, a vote canceling element movable into engagement with the tape, a winding drum for the tape, a pawl and ratchet mechanism between the voting element and drum for turning the latter step by step, and a locking device for releasably holding the drum and permitting the latter to turn upon the return movement of the voting element and the canceling movement of the canceling element.

3. In a voting machine, the combination of a record tape holding means, a voting push button including a stamp for impressing the tape, a canceling push button including means for impressing the tape, springs for returning the push button, the stamp and impressing means being so related to each other as to require the tape to move to bring the stamp impression into line with the canceling impressing means, and an operating mechanism for moving the tape, said mechanism being operatively related with the push button to cause the tape to move prior to the engagement of the canceling element with the tape.

4. In a voting machine, the combination of a record element, a voting element for impressing the record element, a canceling element for impressing the record element, means dependent upon the movement of the voting element to move the record element, a lock for normally holding the record element against movement, means for releasing the lock by the canceling element, and means under the control of an election officer for releasing the lock when the voter does not use the canceling element.

5. In a voting machine, the combination of a record element holding means, a voting element for impressing the record element, a canceling element for impressing the record element, means dependent upon the movement of the voting element to move the record element, a lock for normally holding the record element against movement, means for releasing the lock by the canceling element, means under the control of an election officer for releasing the lock when the voter does not use the canceling element, and a device to prevent the canceling element from being operated while the voting element is being operated or vice versa.

6. In a voting machine, the combination of a record tape holding means, a voting element for impressing the tape, a canceling element for impressing the tape, push buttons for the elements, springs for returning the push buttons to normal position, a pivoted dog arranged normally to prevent movement of the canceling element, means movable with the voting element for throwing the dog to release position and rendering the canceling element operative, a member pivoted on and movable with the canceling element, a fixed abutment with which the member is adapted to engage, and a stop movable with the voting element and arranged to engage the said member whereby the latter prevents simultaneous movement of the elements into engagement with the tape.

7. In a voting machine, the combination of a record tape holding means, a spring-returned voting element for impressing the tape, a winding drum, a ratchet wheel connected with the drum, a pawl carried by the voting element for engaging the ratchet wheel during the impression movement of the element, a lost motion connection between the pawl and voting element whereby the pawl moves with the latter during a portion of each stroke thereof, a lock for preventing movement of the drum during the impression of the element, and means for releasing the lock to permit the drum to turn during the return movement of the voting element.

8. In a voting machine, the combination of a holding means for an impression-receiving element, a voting element movable into and out of engagement with the impression-receiving element, a device operated by the movement of the voting element for moving the impression element step by step, a registering mechanism for registering the number of times the voting element is operated, and a locking device adapted to be set at the end of an election for locking engagement with both the voting element and registering device.

9. In a voting machine, the combination of a record element holding means, voting and canceling elements associated therewith, a registering mechanism for registering the votes impressed on the record element, a canceling bar connected with the canceling element and including hingedly connected sections, a wheel connected with the registering mechanism for turning the same to subtract a vote added by the movement of the voting element, means for moving the canceling bar into engagement with the wheel when the bar reaches a predetermined position, and means for maintaining the engagement of the bar with the wheel during the effective movement of the bar and to permit the bar to release the wheel at the end of its effective movement.

10. In a voting machine, the combination of a record element holding means, voting and canceling elements associated therewith, a registering mechanism for registering the votes impressed on the record element, a canceling bar connected with the canceling element and including hingedly connected sections, a wheel connected with the registering mechanism for turning the same to subtract a vote added by the movement of the voting element, means for moving the canceling bar into engagement with the wheel when the bar reaches a predetermined position, means for maintaining the engagement of the bar with the wheel during the effective movement of the bar and to permit the bar to release the wheel at the end of its effective movement, a device normally preventing movement of the record element, and means movable with the canceling bar for releasing the device before the canceling element engages and after the voting element disengages the record element.

11. In a voting machine, the combination of a vote registering mechanism, a voting element for turning the same to count a vote, means for turning the registering mechanism backwardly to subtract a vote, a vote canceling element, a sliding bar between the canceling element and said means and including hingedly connected sections, a device placed under tension during the sliding movement of the bar in one direction, and means operating on one section of the bar to hold the latter out of engagement with the said means while the bar moves in one direction, and into engagement with the said means as the bar moves in the opposite direction.

12. In a voting machine, the combination of a vote registering mechanism, a voting element for turning the same to count a vote, means for turning the registering mechanism backwardly to subtract a vote, a vote canceling element, a sliding bar between the canceling element and said means and including hingedly connected sections, a device placed under tension during the sliding movement of the bar in one direction, means operating on one section of the bar to hold the latter out of engagement with the said means while the bar moves in one direction, and a lock releasable by the voting movement of the voting element and arranged to engage the other section of the canceling bar to prevent movement of the canceling element before movement of the voting element.

13. In a voting machine, the combination of a reciprocatory voting element, a reciprocatory canceling element, a stop on one element, a pivoted device on the other element with which the stop is adapted to engage, and a fixed stop with which the device engages whereby the device coöperates with the stops for preventing simultaneous operation of the elements.

14. In a voting machine, the combination of a unit frame, a voting element within the frame, a canceling element exterior to the frame, said frame having a slot, a pivoted device on the canceling element extending through the slot and adapted to engage one end thereof, and a stop on the voting element adapted to engage the device and to coöperate therewith in the said end of the slot to prevent simultaneous operation of the said elements.

15. In a voting machine, the combination of a frame and a pair of affirmative and negative voting units disposed side by side and independently removable from the frame, each unit including a member movable during voting, a lock for holding the member in the position to which it is moved during voting, and means controlled by the election officer for releasing the lock to permit the unit to re-set, with a lockout device mounted on the frame to remain in position while either or both units are removed and arranged to be operated by either unit for locking out the other until the actuated unit is re-set.

16. In a voting machine, the combination of a cabinet, separate groups of straight and split ticket voting units individually removable from the cabinet with coöperating mechanism mounted on the cabinet and remaining *in situ* while any or all of the units are removed, said mechanism consisting of the following parts, viz., an interlocking means for locking any group of units out of use, means under the control of an election officer for restoring the units to normal position after voting, a lock for holding the interlocking means in the position to which the voter has moved it, means for restoring the interlocking means when the lock is released, and means for releasing the lock by the movement of the restoring means.

17. In a voting machine, the combination of separate groups of straight ticket and split ticket voting units, an interlocking mechanism for locking either group of units out of use, a mechanism under the control of an election officer for restoring the units to normal position after voting, a lock for holding the interlocking mechanism to the position in which the voter moved it, means for restoring the interlocking mechanism when the lock is released, and means for releasing the lock by the movement of the resetting mechanism, said interlocking mechanism comprising a bar for each group of units having a plurality of L-shaped fingers disposed between and each adapted to extend into a split ticket unit for locking the same, one finger having a portion adapted to control the straight ticket unit.

18. In a voting machine, the combination of groups of straight and split ticket units, an interlocking mechanism for locking either group of units out of use, means for holding the interlocking mechanism in the position to which the voter moves it, a lever connected with the said means for releasing the same from the interlocking mechanism, a resetting mechanism under the control of an election officer, a snail cam for actuating the lever by the resetting mechanism, means for turning the cam, said lever serving by engagement with the cam to prevent reverse movement of the latter.

19. In a voting machine, the combination of groups of straight and split ticket units, an interlocking mechanism for locking either group of units out of use, means for holding the interlocking mechanism in the position to which the voter moves it, a lever connected with the said means for releasing the same from the interlocking mechanism, each unit having a lock for holding the voting mechanism thereof in predetermined position after voting, a resetting frame for releasing all the locks of those units that have been operated when the voter casts his vote, a shaft operatively related to the resetting frame for actuating the same, a snail cam on the shaft for tilting the said lever and coöperating with the latter for preventing reverse turning of the shaft, and means on the shaft under the control of an election officer for turning the same.

In testimony whereof I affix my signature in presence of two witnesses.

GEORGE W. HENNING.

Witnesses:
M. E. PAGE,
CHAS. A. PAGE.

Copies of this patent may be obtained for five cents each, by addressing the "Commissioner of Patents, Washington, D. C."